United States Patent
Inoue et al.

(10) Patent No.: US 10,566,660 B2
(45) Date of Patent: Feb. 18, 2020

(54) FILM PACKAGED BATTERY

(71) Applicant: NEC Corporation, Tokyo (JP)

(72) Inventors: Kazuhiko Inoue, Tokyo (JP); Makihiro Otohata, Tokyo (JP); Shinya Sudo, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 172 days.

(21) Appl. No.: 15/576,073

(22) PCT Filed: Jun. 3, 2016

(86) PCT No.: PCT/JP2016/066637
§ 371 (c)(1),
(2) Date: Nov. 21, 2017

(87) PCT Pub. No.: WO2016/195087
PCT Pub. Date: Dec. 8, 2016

(65) Prior Publication Data
US 2018/0175451 A1 Jun. 21, 2018

(30) Foreign Application Priority Data
Jun. 4, 2015 (JP) ................ 2015-113792

(51) Int. Cl.
*H01M 4/00* (2006.01)
*H01M 10/0585* (2010.01)
*H01M 10/0587* (2010.01)
*H01M 2/02* (2006.01)
*H01M 2/16* (2006.01)

(52) U.S. Cl.
CPC ..... *H01M 10/0585* (2013.01); *H01M 2/0267* (2013.01); *H01M 2/0287* (2013.01); *H01M 2/1653* (2013.01); *H01M 10/0587* (2013.01)

(58) Field of Classification Search
CPC ......... H01M 10/0585; H01M 10/0587; H01M 10/04; H01M 2/0267; H01M 2/0287; H01M 2/1653; H01M 2/02; H01M 2/14; H01M 2/16
See application file for complete search history.

(56) References Cited

U.S. PATENT DOCUMENTS 6,743,546 B1 * 6/2004 Kaneda ................. H01M 2/021
429/127

FOREIGN PATENT DOCUMENTS

| JP | 3602797 B2 | 12/2004 |
| JP | 2005-071658 A | 3/2005 |
| JP | 2006-196276 A | 7/2006 |
| JP | 2010-192462 A | 9/2010 |

(Continued)

OTHER PUBLICATIONS

International Search Report of PCT/JP2016/066637 dated Sep. 6, 2016 [PCT/ISA/210].

*Primary Examiner* — Raymond Alejandro
(74) *Attorney, Agent, or Firm* — Sughrue Mion, PLLC (57) ABSTRACT

A film package battery 1 has a battery element (20) having a positive electrode, a negative electrode and a separator that are stacked or wound, wherein, at least at 200° C., the separator does not melt or soften and has a heat shrinkage ratio of 3% or less; a film package (10) enclosing the battery element; and a fixing tape (70) fixed to a part of the battery element and fixed to an inner surface of the film package.

11 Claims, 7 Drawing Sheets

(56) References Cited

FOREIGN PATENT DOCUMENTS

| | | | |
|---|---|---|---|
| JP | 2011-233534 | A | 11/2011 |
| JP | 2012-049052 | A | 3/2012 |
| WO | 2014/141640 | A1 | 9/2014 |

* cited by examiner

FILM PACKAGED BATTERY

CROSS REFERENCE TO RELATED APPLICATIONS

This application is a National Stage of International Application No. PCT/JP2016/066637, filed Jun. 3, 2016, claiming priority based on Japanese Patent Application No. 2015-113792, filed Jun. 4, 2015, the contents of all of which are incorporated herein by reference in their entirety.

TECHNICAL FIELD

The present invention relates to a film package battery, and more particularly to a highly reliable film package battery that is excellent in heat resistant safety and less susceptible to vibration and impact.

BACKGROUND ART

In recent years, miniaturization and weight reduction have been strongly demanded for batteries used as power sources for electronic devices, automobiles, and the like. With respect to a package for batteries, laminate films have been increasingly used, instead of the conventional metallic cans. As a laminate film, generally known are those using aluminum as a metal thin film, and nylon (registered trademark) or polyethylene terephthalate for the outer surface of the battery, and polyethylene or polypropylene for the inner surface as a fusion bondable resin film. A film package battery is obtained by enclosing a battery element together with an electrolyte in an outer package (also referred to as "film package") made of such a laminate film.

In such a film package, there is a problem that when a large shock is applied to the battery, for example, during use or transportation of the battery, the internal battery element is displaced, and as a result, electrode tabs and the structure therearound may be damaged. As a technique for fixing the battery element to the film package, for example, Document 1 discloses that a fixing tape is attached to a stacked battery element and that fixing tape is thermally fused and bonded to the outer package.

CITATION LIST

Patent Document

Patent Document 1: Japanese Patent No. 3602797

SUMMARY OF INVENTION

Technical Problem

The above-mentioned patent document 1 discloses various forms for fixing the battery element. However, since the separator is made of a polymer film, the separator is likely damaged by heat in the process of fusion-bonding the fixing tape with the outer package. On the other hand, in recent years, the energy of film package batteries has been increasing, and therefore it is also important to ensure heat resistant safety. Accordingly, an object of the present invention is to provide a highly reliable film package battery which is excellent in heat resistant safety and less susceptible to vibration and impact.

Solution to Problem

In order to achieve the above object, the battery according to one embodiment of the present invention is as follows:

a film package battery comprising: a battery element having a positive electrode, a negative electrode and a separator that are stacked or wound, wherein, at least at 200° C., the separator does not melt or soften and has a heat shrinkage ratio of 3% or less, a film package enclosing the battery element, a fixing tape fixed to a part of the battery element and fixed to an inner surface of the film package.

(Explanation of Terms)

"Film package battery" means a battery in which a battery element is enclosed in a film package together with an electrolyte. In general, it has a flat shape as a whole. For example, batteries for electric vehicles are required to have a large capacity, a low internal resistance, a high heat dissipation property, and the like. A film package battery is advantageous in these requirements.

"film package" refers to an outer package formed of film(s) having flexibility and enclosing a battery element. It may be formed by disposing two films so as to face each other and fusion-bonding them to hermetically seal the battery element, or may be formed by disposing one film to be folded back and fusion-bonding the opposed surfaces to hermetically seal the battery element.

Regarding the numerical range, when it is described as "a to b" in the present specification, it is intended to be a or more and b or less.

Advantageous Effect of Invention

According to the present invention, it is possible to provide a highly reliable film package battery which is excellent in heat resistant safety and is hardly affected by vibration and impact.

BRIEF DESCRIPTION OF DRAWING

FIGS. 7(*a*) and 7(*b*) are schematic views showing another example of the attaching position of a fixing tape.

FIGS. 9(*a*) and 9(*b*) are views for explaining another example of the outline shape of the fixing tape.

DESCRIPTION OF EMBODIMENTS

1. Basic Configuration of Film Package Battery

A basic configuration of a film package battery will be described with reference to FIGS. 1 to 3. As will be described later, the battery according to one embodiment of the present invention is characterized by including a fixing tape for fixing the battery element. For convenience of explanation, however, illustration thereof is omitted in FIGS. 1 to 3. Hereinafter, a film package battery will be explained by taking the battery element of stacked type as an example, but the present invention itself is not necessarily limited to a stacked type battery but can be applied to a wound type battery or the like.

A film package battery 1 according to one embodiment of the present invention comprises a battery element 20, a film package 10 enclosing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween. In the positive electrode 30, an electrode material 32 is applied to both surfaces of a metal foil 31, and also in the negative electrode 40, an electrode material 42 is applied to both surfaces of a metal foil 41 in the same manner. The overall external shape of the battery element 20 is not particularly limited, but in this example it is a flat substantially rectangular parallelepiped.

The positive electrodes 40 and the negative electrodes 30 respectively have an extended portion in part of the outer periphery. The extended portion of the positive electrode 30 and the extended portion of the negative electrode 40 are shifted so as to be staggered position with each other in order not to interfere with each other when the positive electrode and the negative electrode are stacked. The extended portions of the negative electrode are brought together into one and connected to a negative electrode tab 52, and the extended portions of the positive electrode are brought together into one and connected to a positive electrode tab 51 (see FIGS. 2 and 3). The portion in which the extended portions are brought together into one in the stacking direction in this manner is also referred to as a "current collecting portion" or the like. Resistance welding, ultrasonic welding, laser welding, caulking, adhesion using a conductive adhesive, or the like can be adopted as the method of connecting the current collecting portion and the electrode tab.

As the electrode tab, various materials can be employed. For example, the positive electrode tab 51 is made of aluminum or an aluminum alloy, and the negative electrode tab 52 is made of copper or nickel. When the material of the negative electrode tab 52 is copper, nickel may be arranged on the surface. The electrode tabs 51 and 52 are electrically connected to the battery element 20 and extended to the outside of the film package 10.

2. Structure of Each Part

For each element of the battery element, those shown below may be adopted.

<Separator>

As a separator, for example, aramids, polyimides, polyesters, cellulose, polyolefin resins such as polyethylene and polypropylene, and the like can be used. A material obtained by crosslinking a polyolefin resin with electron beam irradiation or addition of a crosslinking agent to increase its melting point may be used. Further, any structure such as a woven fabric, a nonwoven fabric, a microporous membrane, or the like may be used.

The melting point at which melting or softening of the separator occurs and the temperature at which 3% heat shrinkage occurs are preferably not 200° C. or lower. If the separator melts, the pores of the separator become small, and the ionic conductivity of the electrolyte solution cannot be maintained. If the separator completely melts, the insulation between the electrodes cannot be maintained. Also, if the separator shrinks, insulation between the electrodes cannot be maintained. This shrinkage is preferably 5% or less at 200° C., more preferably 3% or less. The melting point of the separator can be confirmed with a scanning calorimeter (DSC), a viscoelasticity measuring device (DMA), or the like. A linear expansion coefficient measuring device (TMA) can measure not only the melting point but also 3% shrinkage temperature.

In particular, it is preferable that the separator does not deform and shrink up to a temperature higher than the melting point of the fusion bondable layer of the laminate film by 50° C. or more, by 100° C. or more or by 200° C. or more. Therefore, it is preferable that the separator does not have a melting point equal or below these temperatures. The form of the separator may be a web or a sheet. These matters can be employed alone or in combination.

As a separator, a separator made of an inorganic material such as ceramic or glass can also be used. As the inorganic separator, a nonwoven fabric separator made of ceramic short fibers such as alumina, alumina-silica, potassium titanate or the like can be used. Alternatively, it may be a separator having a substrate of a woven fabric, a nonwoven fabric, a paper or a porous film and a layer containing a heat resistant nitrogen-containing aromatic polymer and a ceramic powder. Alternatively, it may be a separator having a heat resistant layer provided on a part of the surface, wherein this heat resistant layer is formed from a porous thin film layer containing a ceramic powder, a porous thin film layer of a heat resistant resin, or a porous thin film layer of a composite of a ceramic powder and a heat resistant resin. Alternatively, it may be a separator comprising a layer of a porous membrane having secondary particles bonded by a binder, in which the secondary particles are formed such that a part of primary particles of a ceramic material are sintered or bonded by dissolution-recrystallization. Alternatively, it may be a separator comprising a porous membrane formed by bonding a ceramic material with a binder, wherein the ceramic material used herein is silica ($SiO_2$), alumina ($Al_2O_3$), zirconium oxide ($ZrO_2$), titanium oxide ($TiO_2$), nitride of silicon (Si), hydroxide of aluminum (Al), alkoxide of zirconium (Zr), or ketone compound of titanium (Ti). Alternatively, it may be a separator comprising a polymer substrate and a ceramic containing coating layer formed on the polymer substrate, wherein the ceramic is $Al_2O_3$, MgO, $TiO_2$, $Al(OH)_3$, $Mg(OH)_2$, $Ti(OH)_4$, or the like.

<Negative Electrode>

The negative electrode has a negative electrode current collector formed of a metal foil and a negative electrode active material layer coated on both sides of the negative electrode current collector. The negative electrode active material is bound on the negative electrode current collector by a binder for a negative electrode so as to cover it. The negative electrode current collector is arranged to have an extended portion connected to a negative electrode terminal, and the negative electrode active material is not applied to this extended portion.

The negative electrode active material in the present embodiment is not particularly limited, and examples thereof include carbon materials capable of absorbing and desorbing lithium ions, metals capable of forming an alloy with lithium, a metal oxide capable of absorbing and desorbing lithium ions, and the like.

Examples of carbons include carbon, amorphous carbon, diamond-like carbon, carbon nanotube, and composites of these. Highly crystalline carbon is excellent in high electrical conductivity, in adhesion to a negative electrode current collector made of a metal such as copper, and in voltage flatness. On the other hand, amorphous carbons having a low crystallinity exhibit relatively small volume expansion, and therefore have effect of highly relaxing the volume expansion of the whole negative electrode, and hardly undergo the degradation due to nonuniformity such as crystal grain boundaries and defects.

A negative electrode containing a metal or a metal oxide is preferable in that energy density can be improved and the capacity per unit weight of the battery or capacity per unit volume can be increased.

Examples of metals include Al, Si, Pb, Sn, In, Bi, Ag, Ba, Ca, Hg, Pd, Pt, Te, Zn, La, and alloys of two or more of these. These metals or alloys may be used in combination of two or more. In addition, these metals or alloys may contain one or more nonmetallic elements.

Examples of the metal oxide include silicon oxide, aluminum oxide, tin oxide, indium oxide, zinc oxide, lithium oxide, and composites of these. In the present embodiment, it is preferable to include tin oxide or silicon oxide, and more preferably silicon oxide, as the negative electrode active material. This is because silicon oxide is relatively stable and hardly causes reaction with other compounds. It is also possible to add one or more elements selected from nitrogen, boron and sulfur to the metal oxide, for example, in an amount of 0.1 to 5% by mass. This can improve the electrical conductivity of the metal oxide.

Also, the negative electrode active material may be not only used alone, but also in combination. For example, similar materials such as graphite and amorphous carbon may be mixed with each other, or different materials such as graphite and silicon may be mixed.

Examples of the negative electrode binder include, but not particularly limited to, for example, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like. Among them, polyimide and polyamide-imide are preferable because they have a strong binding property. The amount of the negative electrode binder is preferably 0.5 to 25 parts by mass based on 100 pats by mass of the negative electrode active material, from the viewpoint of "the sufficient binding strength" and "the high energy density" being in a trade-off relation with each other.

As the negative electrode current collector, from the view point of electrochemical stability, aluminum, nickel, stainless steel, chromium, copper, silver, and alloys thereof are preferred. As the shape thereof, foil, flat plate, mesh and the like are exemplified.

<Positive Electrode>

The positive electrode has a positive electrode current collector formed of a metal foil and a positive electrode active material coated on both sides of the positive electrode current collector. The positive electrode active material is bound on the positive electrode current collector by a positive electrode binder so as to cover it. The positive electrode current collector is arranged to have an extended portion connected to a positive electrode terminal, and the positive electrode active material is not applied to this extended portion.

The positive electrode active material is not particularly limited as long as it is a material capable of absorb and desorb lithium, but from the viewpoint of high energy density, a compound having high capacity is preferably contained. Examples of the high capacity compound include lithium nickelate ($LiNiO_2$), or lithium nickel composite oxides in which a part of the Ni of lithium nickelate is replaced by another metal element, and layered lithium nickel composite oxides represented by the following formula (A) are preferred.

$$Li_y Ni_{(1-x)} M_x O_2 \quad (A)$$

wherein $0 \leq x < 1$, $0 < y \leq 1.2$, and M is at least one element selected from the group consisting of Co, Al, Mn, Fe, Ti, and B.

In addition, from the viewpoint of high capacity, it is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0 < \alpha \leq 1.2$, $\beta + \gamma + \delta = 1$, $\beta \geq 0.7$, and $\gamma \leq 0.2$) and $Li_\alpha Ni_\beta Co_\gamma Al_\delta O_2$ ($0 < \alpha \leq 1.2$, $\beta + \gamma + \delta = 1$, $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0 < \alpha \leq 1.2$, $\beta + \gamma + \delta = 1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0 < x < 2$), $Li_2MnO_3$, and $Li_xMn_{1.5}Ni_{0.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having olivine structure such as $LiMPO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

Further, it is also possible to use radical material as a positive electrode active material.

As the positive electrode binder, the same binder as the negative electrode binder can be used. The amount of the positive electrode binder is preferably 2 to 15 parts by mass based on 100 parts by mass of the positive electrode active material, from the viewpoint of the binding strength and energy density being in a trade-off relation with each other.

As the positive electrode current collector, the same material as the negative electrode current collector can be used.

For the coating layer of the positive electrode active material, a conductive assisting agent may be added for the purpose of lowering the impedance. Examples of the conductive assisting agent include carbonaceous fine particles such as graphite, carbon black and acetylene black.

<Electrolyte>

As the electrolyte, a nonaqueous electrolyte solution containing a lithium salt (supporting salt) and a nonaqueous solvent dissolving the supporting salt can be used.

As the non-aqueous solvents, aprotic organic solvents such as carbonic acid esters (open chain or cyclic carbonates), carboxylic acid esters (open chain or cyclic carboxylic acid esters), phosphoric acid esters and the like may be used.

Examples of the carbonic acid ester solvents include, cyclic carbonates such as propylene carbonate (PC), ethylene carbonate (EC), butylene carbonate (BC) and vinylene carbonate (VC); open chain carbonates such as dimethyl carbonate (DMC), diethyl carbonate (DEC), ethyl methyl carbonate (EMC) and dipropyl carbonate (DPC); and propylene carbonate derivatives.

Examples of the carboxylic acid ester solvents include aliphatic carboxylic acid esters such as methyl formate, methyl acetate and ethyl propionate; and lactones such as γ-butyrolactone.

Among these, carbonic acid esters (cyclic or open-chain carbonate), such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC), are preferred.

Examples of the phosphoric acid esters include, for example, trimethyl phosphate, triethyl phosphate, tripropyl phosphate, trioctyl phosphate, triphenyl phosphate, and the like.

Examples of solvents that can be contained in the non-aqueous electrolyte solution include, in addition to those mentioned above, for example, ethylene sulfite (ES), propane sultone (PS), butane sultone (BS), dioxathiolane-2,2-dioxide (DD), sulfolene, 3-methylsulfolene, sulfolane (SL), succinic anhydride (SUCAH), propionic anhydride, acetic anhydride, maleic anhydride, diallyl carbonate (DAC), dimethyl 2,5-dioxahexanedionate, dimethyl 2,5-dioxahexanedionate, furan, 2,5-dimethylfuran, diphenyl sulfide (DPS), dimethoxyethane (DME), dimethoxymethane (DMM), diethoxy ethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonates electrolyte, glyme, ether, acetonitrile, propionitrile, γ-butyrolactone, γ-valerolactone, dimethyl sulfoxide (DMSO), ionic liquids, phosphazene, aliphatic carboxylic acid esters such as methyl formate, methyl acetate, and ethyl propionate, or compounds in which a part of hydrogen atoms of these compounds is/are substituted with fluorine atom(s).

The examples of lithium salts include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. Supporting salts may be used alone or in combination of two or more.

Non-aqueous solvent may be used alone, or in combination of two or more.

<Film Package>

As the film of the outer package, a laminate film having a surface layer, a metal layer, and an inner layer can be used. It may be those using aluminum for a metal layer, and nylon (registered trademark) or polyethylene terephthalate for an outer surface layer, and a polyolefin resin such as polyethylene or polypropylene for an inner surface layer. The inner surface layer may be polyethylene having a melting point of 95 to 140° C. or polypropylene having a melting point of 160 to 165° C.

Figure 1:
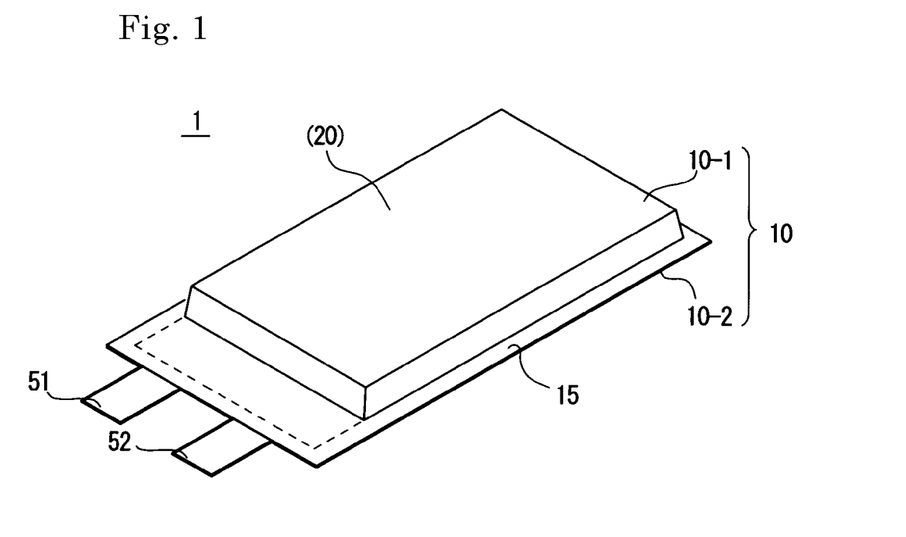
FIG. 1 is a perspective view showing a basic structure of a film package battery.
Figure 2:
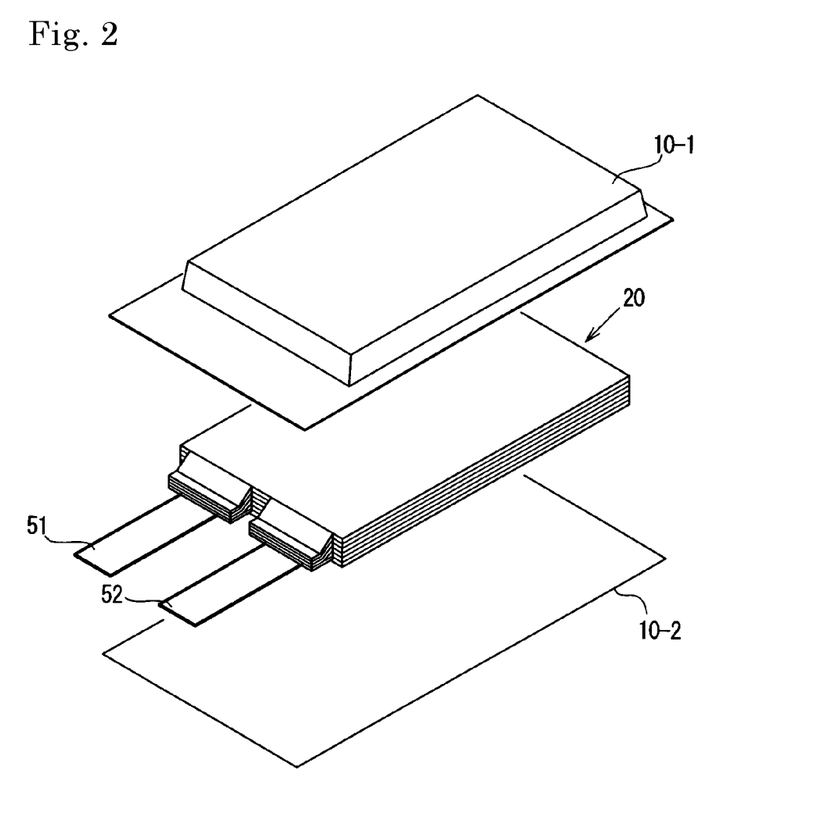
FIG. 2 is an exploded perspective view showing a basic structure of a film package battery.
Figure 3:
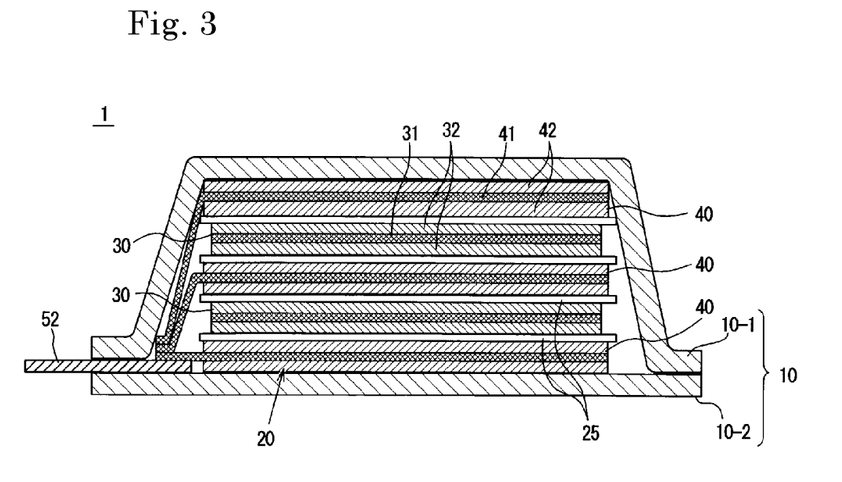
FIG. 3 is a cross-sectional view schematically showing a cross section of the battery of FIG. 1.

In the present embodiment, as shown in FIGS. 1 to 3, the film package 10 may be composed of two films 10-1 and 10-2 disposed so as to face each other. Although not shown, a single film may be folded back to form a film package. The outline shape of the film package 10 is not particularly limited, but it may be a quadrangle, and in this example it is specifically rectangular.

The films 10-1 and 10-2 are thermally fusion-bonded to each other in the peripheral portion of the battery element 20, and the peripheral portion of the film package 10 is a fusion-bonded portion 15. The fusion-bonded portion 15 is formed over the entire circumference of the battery.

In this example, the positive electrode tab 51 and the negative electrode tab 52 are drawn out from one side of short sides of the fusion-bonded portion 15. Of course, the electrode tabs may be drawn out from different two sides respectively. It is preferable in one embodiment that the positive electrode tab 51 and the negative electrode tab 52 are parallel, but the present invention is not limited thereto. An arrangement of the films that may be employed includes, as shown in FIGS. 2 and 3, the structure in which a cup portion is formed in one film 10-1 and a cup portion is not formed in the other film 10-2. Alternatively, an arrangement (not shown) of the film that may be employed includes the structure in which cup portions are formed in both films, or an arrangement (not shown) in which both cup portions are not formed may be employed.

<Fixing Tape>

Figure 4:
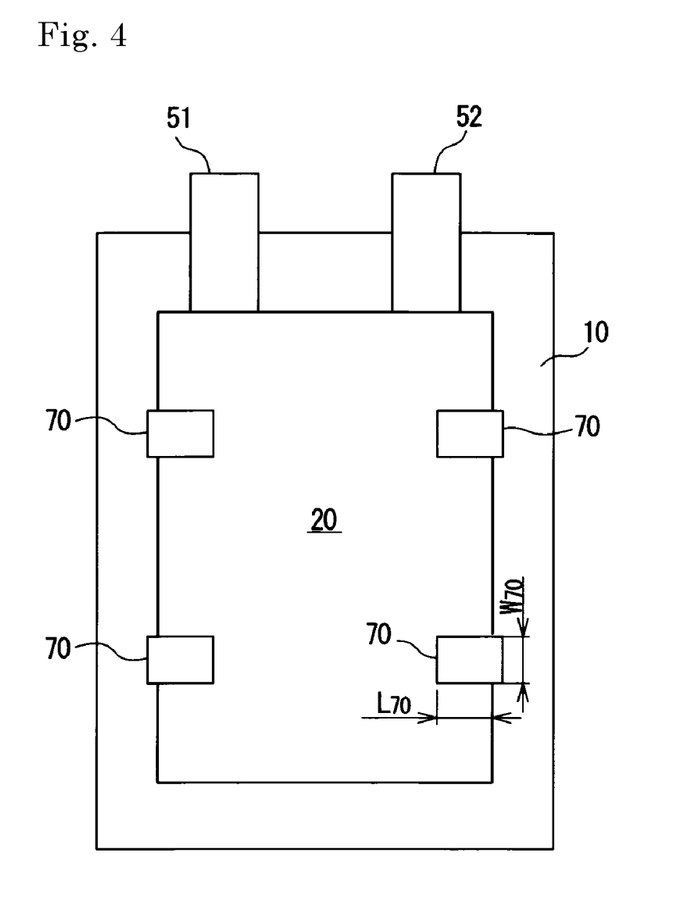
FIG. 4 is a schematic plan view of a film package battery according to one embodiment of the present invention.
Figure 5:
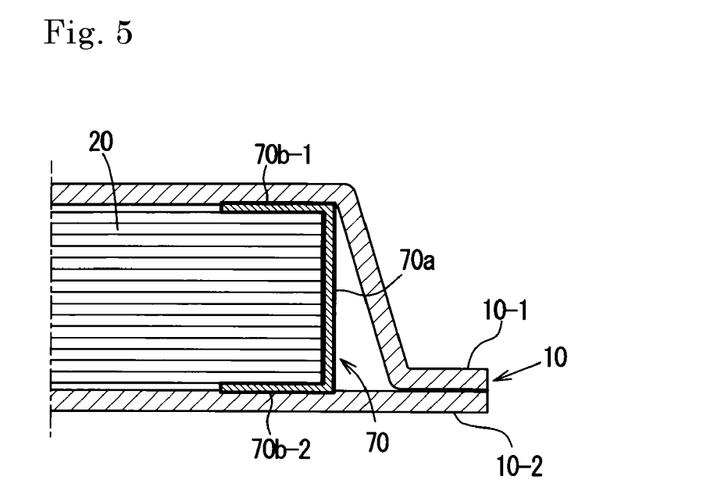
FIG. 5 is a cross-sectional view showing a fixing tape and the structure therearound.

As shown in FIGS. 4 and 5, the film package battery 1 of the present embodiment is provided with a fixing tape 70 for fixing the battery element 20 and the film package 10. The fixing tape 70 may be provided only at one location or may be provided at a plurality of locations. In this example, however, they are provided at four locations (specifically, two on each of left and right side).

As shown in FIG. 5, the fixing tape 70 is attached to the peripheral portion of the battery element 20 in a substantially rectangular channel-shape (rectangular U shape; shape of Japanese katakana "ko"). Specifically, the fixing tape 70 includes a first portion 70a that is fixed to the end face of the battery element 20 (or is not fixed but is simply adjacent thereto) and a second portion 70b-1 that is fixed to the upper surface and a second portion 70b-2 fixed to the lower surface of the battery element 20. Hereinafter, the second portion may be simply denoted by reference numeral 70b. In the above description, the reason why the state in which the first portion 70a is not "fixed" but "adjacent to" is also embraced by one embodiment of the present invention is that the present invention is intended to embrace, for example, the following case. That is, it is the case in which the portions 70b-1 and 70b-2 on both end sides of the fixing tape 70 are fixed to the battery element 20, whereas the first portion 70a is not fixed to the end portion of the battery element 20. Specifically, examples include the case where the electrodes are not aligned on the side surface of the battery element 20 and the fixing tape is not attached to the end face of the battery element, and the case where only the first portion 70a is not attached to the end face of the battery element intentionally.

In the case where the film 10-1 or 10-2 has a fusion bondable layer sufficient for fusion bonding with the battery element, the fixing tape may have an outline of concavo-convex shape, in order to prevent the fixing tape from escaping from the position between the battery element and the film. Specifically, it may have a shape as exemplified in FIG. 8 (a schematic plan view seen from the upper surface side of the battery). In this example, the outline of the fixing tape 170 is an irregular shape having a triangular wave shape. In the figure, both side edges 170p of the fixing tape 170 (herein, side edge means an edge intersecting with the edge 20e of the battery element 20) and the edge 170q of the end portion are both formed in a concavo-convex shape, but at least one of them, or only the both side edges 170p may have a concavo-convex shape.

Figure 8:
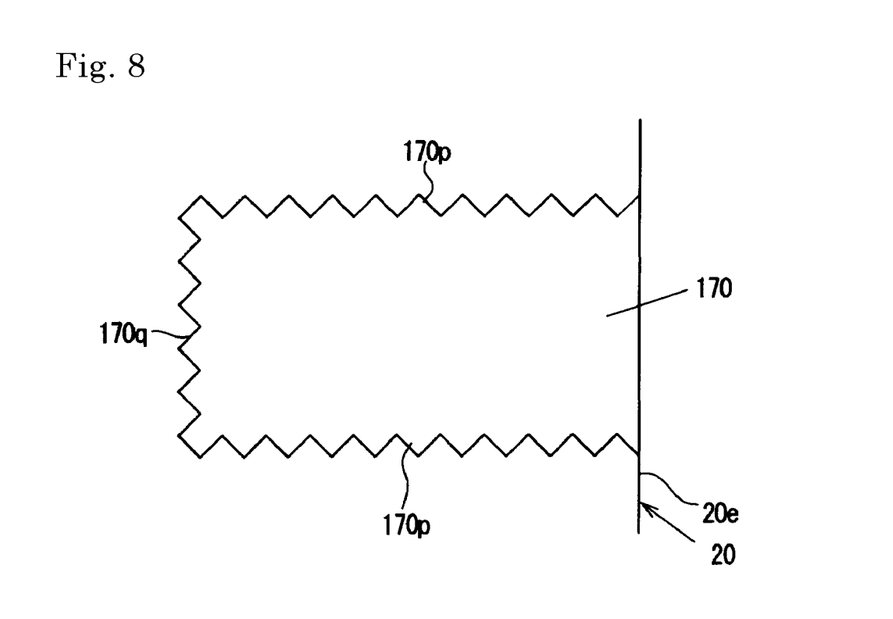
FIG. 8 is a schematic view for explaining an example of a outline shape of a fixing tape.
Figures 9A, 9B:
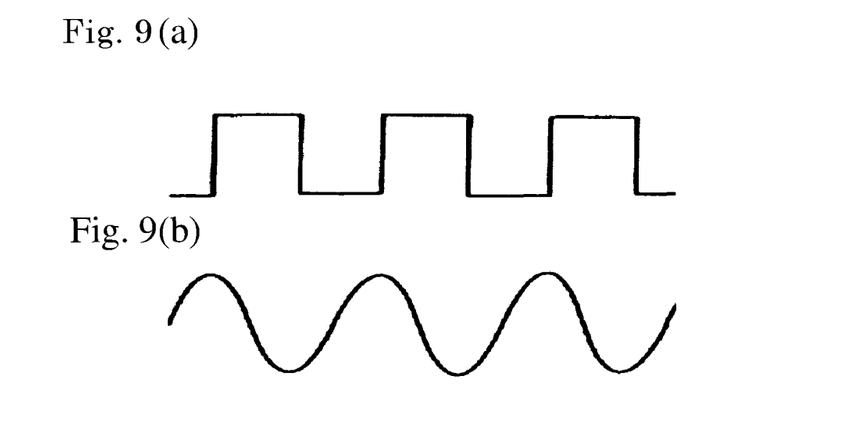

In addition to the shape as shown in FIG. 8, the outline of the fixing tape may be a concavo-convex shape having a rectangular wave shape as shown in FIG. 9(a), or a concavo-convex shape having a sinusoidal wave shape as shown in FIG. 9(b). Needless to say, such a shape that deformation is made to these, can also be employed, for example, a concavo-convex shape having a trapezoidal shape.

Figure 10:
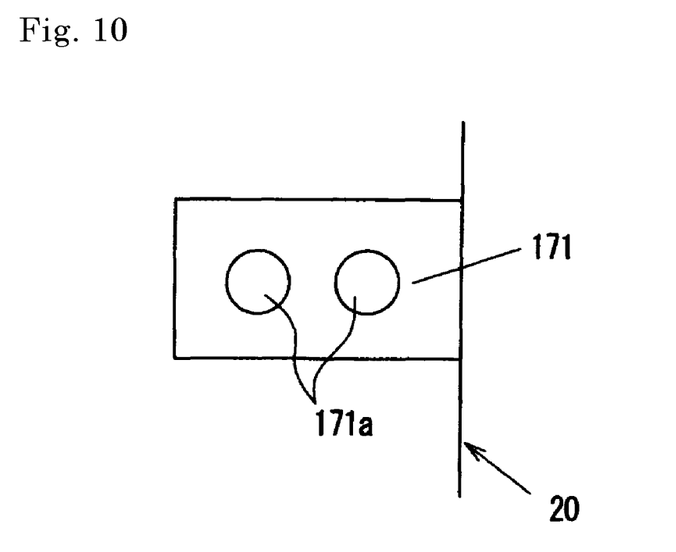
FIG. 10 is a view showing an example in which holes are provided in a fixing tape.

In addition, as shown in FIG. 10, a fixing tape 171 having one or a plurality of holes 171a may be used. The holes 171a may be formed in the second portions 70b-1 and 70b-2 (both or one of them) of the tape. Needless to say, one or a plurality of holes may be provided in the fixing tape whose outline has concavo-convex shape. While FIG. 10 shows an example in which the holes 171a are arranged in the length direction of the tape, a plurality of holes may be provided in the width direction. Regarding the shape of the hole 171a, it is not limited to a circular shape, but it may be any shape such as a quadrilateral shape or a polygonal shape.

FIG. 5 is a cross-sectional view of the completed state of the product. In this state, the outer surface (the surface facing the film package) of the second portion 70b is fusion bonded to the inner surface of the film package 10, and the inner surfaces (the opposite side to the surfaces facing the film package) of the second portions 70b-1 and 70b-2 are bonded to the upper surface and the lower surface of the battery element 20. In FIG. 5, only one fixing tape 70 and the structure therearound are illustrated, but the other three fixing tapes 70 can have the same configuration.

In case that the fixing tape 70 is attached in a manner as shown in FIG. 4, the relationship between the size of the battery element 20 and the length of the fixing tape 20 may be as follows, for example. That is, when the length of the portion of the fixing tape 70 to be attached to the main surface of the battery element 20 is taken as $L_{70}$ and the width is taken as $W_{70}$, it is preferable in one embodiment that the values of $L_{70}$ and $W_{70}$ are both set to about 1 mm or more, 2 mm or more, or 3 mm or more. If the width or length of the fixing tape is too short (i.e. when $L_{70}$ and $W_{70}$ is too small), the fixing effect by the fixing tape may not be obtained sufficiently in some cases.

According to the configuration of this embodiment, since the battery element 20 and the film package 10 are fixed via the fixing tape 70 in this way, even if an impact is applied to the battery element 20 during use or transportation, the battery element 20 is prevented from moving in the film package. Therefore, it is possible to prevent damage to the electrode tabs and the structures therearound and the like.

Figure 6A:
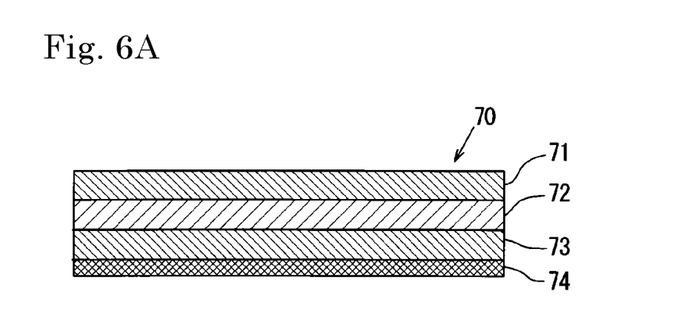
FIG. 6A is a cross-sectional view showing a layer structure of a fixing tape.
Figure 6B:
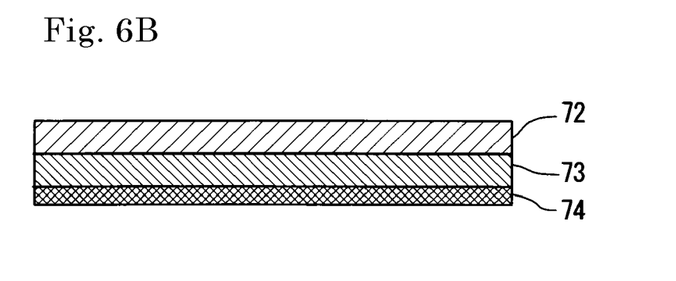
FIG. 6B is a cross-sectional view showing another example of the layer structure of a fixing tape.

The fixing tape 70 may have a multilayer structure as shown in FIG. 6A, for example. In this example, the fixing tape 70 comprises a heat resistant layer 72 serving as a base material, a first fusion bondable layer 71 laminated on one surface of the heat resistant layer 72, a second fusion bondable layer 73 laminated on the other surface, and a pressure-sensitive adhesive layer 74 for temporarily fixing the fixing tape 70 to the element. In another embodiment, as shown in FIG. 6B, the fixing tape 70 may be a tape in which the first fusion bondable layer 71 is omitted. Since the fixing tape of FIG. 6B has a structure not having the fusion bondable layer 71, it is preferable because the battery can be made thin. Since the films 10-1 and 10-2 has a fusion bondable layer, the fusion bonding between the fixing tape 70 and the films 10-1 or 10-2 is possible. However, it is preferable to have the fusion bondable layer 71 because the bonding strength with the inner surface of the outer package is increased.

In still another embodiment, such a fixing tape may be used that has a heat resistant base material which is not a film but made of fibers such as a nonwoven fabric or a woven fabric. The fixing tape of FIG. 6C has a composite layer 75 obtained by impregnating fibers with a fusion bondable layer, and a pressure-sensitive adhesive layer 74. The tape having such a structure can be bonded to both faces because the fusion bondable layer is impregnated into the fiber. Therefore, it achieves the same effect as the tape having two fusion bondable layers as shown in FIG. 6A, and such a configuration is preferable because it can obtain high adhesive strength on both sides. In this case, since the woven fabric is superior in tensile strength to the nonwoven fabric, the effect of bundling the battery element is high. On the other hand, since the nonwoven fabric is thin and inexpensive, it is low cost and thus preferred.

As the material of the fusion bondable layers 71, 73 (including the "fusion bondable layer" in the configuration of FIG. 6C), a thermoplastic resin material can be used. It may be, for example, PP (polypropylene), PE (polyethylene) or the like. It is preferable that the melting point (Ta) of the fusion bondable layers 71, 73 is lower than the melting point of the separator and the temperature (Ts) at which 3% heat shrinkage occurs. This prevents the separator from being damaged by heat during fusion bonding (to be described in detail later) by heat pressing. In one example, it is preferable that the melting point (Ta) of the fusion bondable layers 71, 73 is lower, preferably by 10° C. or more, 20° C. or more or 30° C. or more, than the melting point and the temperature (Ts) at which 3% heat shrinkage occurs of the separator.

As the material of the heat resistant layer 72, crosslinked product of PP (polypropylene) or PE (polyethylene), nylon (registered trademark), or the like can be used. The melting point (Tb) of the heat resistant layer 72 is higher, preferably by 10° C. or more, 20° C. or more, or 30° C. or more, than the melting point (Ta) of the fusion bondable layers 71, 73. The material of the heat resistant layer 72 is preferably a material having high adhesion to the fusion bondable layer 73 and the fusion bondable layer 71, or the fusion bondable layer of the films 10-1 and 10-2, so that the difference of the solubility parameter (SP) between them is 5 $(\text{cal/cm}^3)^{(1/2)}$ or less, preferably 3 $(\text{cal/cm}^3)$ or less, and more preferably 2 $(\text{cal/cm}^3)^{(1/2)}$ or less.

Figure 6C:
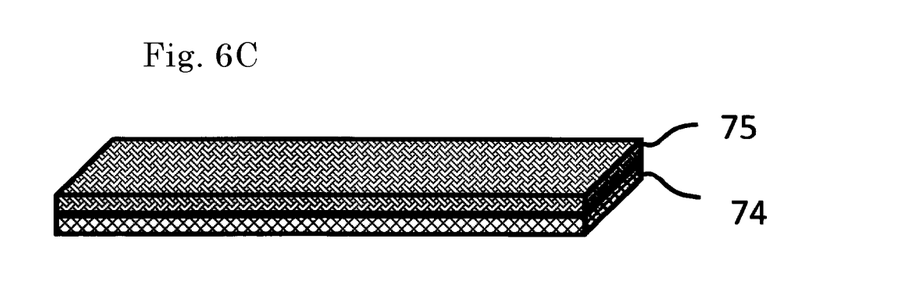
FIG. 6C is a cross-sectional view showing still another example of the layer structure of a fixing tape.

In the case where the heat resistant layer is in the form of a fibrous layer as shown in FIG. 6C, since the melted layer is impregnated in the fiber layer, delamination does not take place even if the difference of the solubility parameters of both exceeds 5 $(\text{cal/cm}^3)^{(1/2)}$. The difference of the solubility parameters does not need to be considered and thus this configuration is preferred. As a material of the fiber layer, in addition to the above-mentioned fiber using resins such as crosslinked product of PP or PE, nylon or the like as a raw material, inorganic materials such as glass fiber, carbon fiber or metal fiber may be used. An inorganic material has higher heat resistance than the fusion bondable layer by several hundreds ° C. or more, so that it is preferable because there is no risk of breaking when fixing a battery element with heat.

For example, the pressure-sensitive adhesive layer 74 may be a layer of an acrylic pressure-sensitive adhesive. Although not shown in the drawing, a pressure-sensitive adhesive may be applied to the entire surface of the fusion bondable layer 73, or a pressure-sensitive adhesive may be applied in a predetermined pattern such as a dot pattern or a stripe pattern instead of applying to the entire surface.

The thickness of each layer is preferably, for example, about 10 μm to 100 μm for the fusion bondable layers 71, 73 and about 10 μm to 50 μm for the heat resistant layer 72. The thickness of the pressure-sensitive adhesive layer 74 is preferably, for example, 50 μm or less, 30 μm or less, or 10 μm or less.

Subsequently, the outline of the method of manufacturing the secondary battery of the present embodiment having the above-described configuration will be described. Basically, since a conventionally known method for manufacturing this type of film package battery can be used, a detailed explanation will be omitted, and explanation will be given to mainly processes related to attachment of the fixing tape and fusion bonding.

First, a positive electrode active material layer containing a positive electrode active material is formed on a current collector, a negative electrode active material layer containing a negative electrode active material is formed on a current collector, and the positive electrode active material layer and the negative electrode active material layer are stacked with a separator interposed therebetween, which are further stacked and are pressed to form a battery element.

Next, a fixing tape is attached to the peripheral portion of the stack of the electrodes and the separators. In the conventional manufacturing method, a tape or the like is sometimes used for temporary fixing (shape maintenance) of the battery element. However, according to the manufacturing method of this embodiment, the fixing tape that is used to finally fix the stack to the film package can be used as a tape for temporary fixing.

Next, the positive electrode tab and the negative electrode tab are connected to the positive electrode and the negative electrode by a conventionally known method. The battery element formed in this way is placed in a film package which is heat sealed at three sides and formed in a bag shape.

Thereafter, the fixing tape 70 placed inside is heated by heat-pressing from the outside of the film package at a predetermined temperature, pressure and time conditions, so that the inner fusion bondable layer 73 (see FIG. 6) and the battery element 20 are fixed, and simultaneously the outer fusion bondable layer 71 and the inner surface of the film package 10 are fusion-bonded.

If higher temperature is used for the heat press relative to the melting point of the fusion bondable layers 71, 73, the fusion bonding can be achieved in a shorter time. Thus, the temperature of the heat press is higher than the melting point of the fusion bondable layers, preferably higher than the melting point by 10° C. or more, and more preferably by 20° C. or more. In order to prevent the deformation or the breakage of the outer package film, it is necessary that the heat press temperature does not exceed the melting point of the outer package film. In addition, if the fixing tape is cut due to melting by the heat fusion process, it is not possible to integrate the battery elements. Therefore, the heat press temperature is preferably lower than the melting point (Tb) of the heat resistant layer 72.

Furthermore, when the heat press temperature exceeds the melting point of the separator, there is a possibility that pores through which the electrolyte passes may be blocked, and therefore it is preferred that the heat press temperature does not exceed the melting point of the separator. In other words, for the melting point of the separator, the higher is preferred, and preferably not equal to or lower than 200° C.

Regarding the position where heat press is performed, the upper surface or the lower surface, preferably both surfaces of the fixing tape, is heated via the film package 10. Regarding the heating area, if only the fixing tape is fixed inside of the outer package, the heating is preferably performed only in the range equal to or smaller than the area of the second portion 70b which is the bonding surface between the fixing tape and the film package. On the other hand, if the electrode outermost layer is also bonded by utilizing the fusion bonding layer on the inner surface of the film package, the heating is preferably performed also in the portion where the fixing tape is not temporarily affixed.

Then, after feeding the electrolyte solution into the film package, the remaining side is thermally fused and sealed. The sealing step can be carried out under a reduced pressure atmosphere (in a decompression chamber). When the film package battery after sealing is returned under the atmospheric pressure, the outer package film is pressed against the battery element by the atmospheric pressure, and the outer package film is brought into close contact with the battery element.

In the configuration of the present embodiment, since the melting points of the fusion bondable layers 71, 73 of the fixing tape 70 are lower than the melting point of the separator, the separator is not damaged by heat during this heat press. In addition, since the heat resistant layer 72 is provided within the fixing tape 70 itself, the strength of the fixing tape 70 is secured. In the state after the heat press, the fixing tape 70 is fixed with sufficient strength because the fusion bondable layer 73 is fused and bonded to the battery element, which is not a temporary fixing by the pressure-sensitive adhesive layer 74.

Although the present invention has been described with reference to specific embodiments, various modifications are possible in the configurations of film package battery without departing from the spirit of the present invention.

Figure 7A:
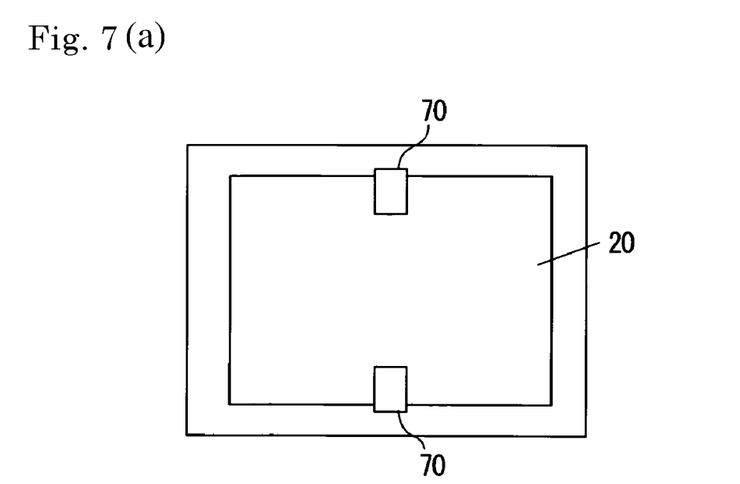

(a) For example, the above description has been made to the example in which the fixing tape is provided at four positions on the peripheral portion of the battery element, but it is of course possible that the fixing tape is provided at smaller or larger number of positions. For example, as shown in FIG. 7 (a), the fixing tape 70 may be provided at each one of opposite sides of the battery element 20. Alternatively, one or more fixing tapes may be provided on all four sides, or one or more fixing tapes may be provided on three or less than three sides.

Figure 7B:
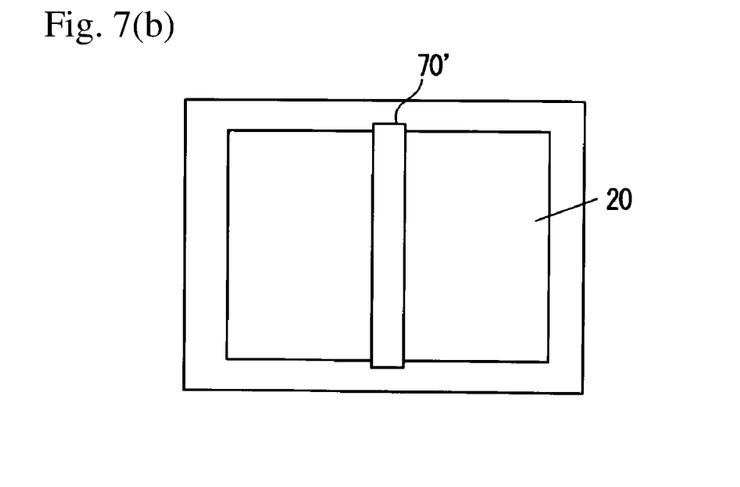

(b) In the configuration of FIG. 7 (a), the fixing tape 70 is relatively short. Instead, as shown in FIG. 7 (b), a fixing tape 70' may be provided so as to extend over the entire longitudinal (or lateral) direction of the battery element 20. The fixing tape 70' may be attached to the entire circumference of the battery element 20, or may be attached to only a part, not to the entire circumference. However, in consideration of the facts that the electrolyte solution spreads to the vicinity of the central portion of the battery element 20 and that a complicated solution injection step is not required, preference is given to the configuration where only a part of the battery element 20 is fixed as shown in FIG. 7(a) and FIG. 4.

Figure 11:
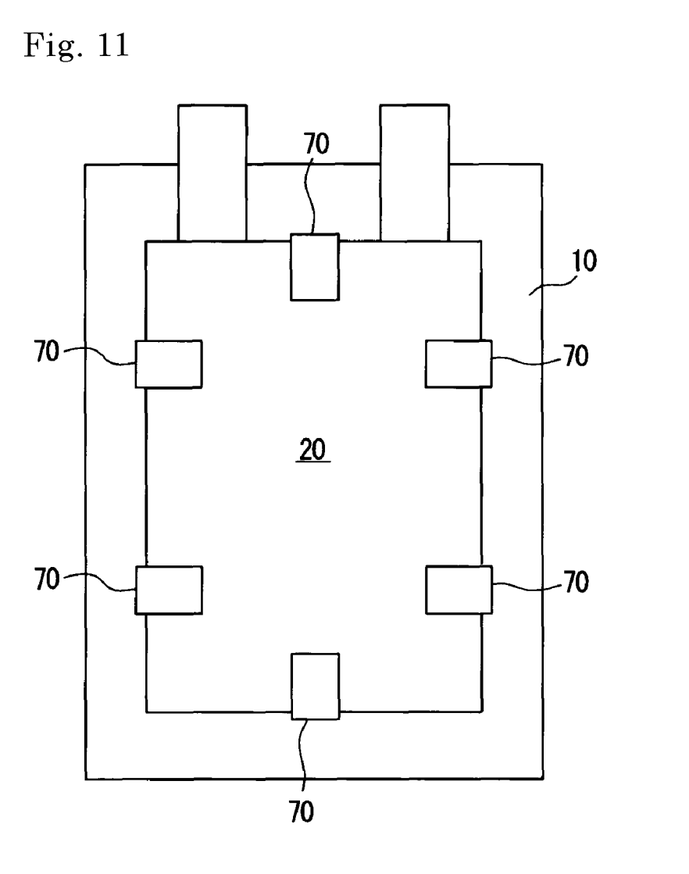
FIG. 11 is a schematic plan view of a film package battery according to another embodiment of the present invention.

Example of the configuration in which one or more fixing tapes are provided on all four sides include, as shown in FIG. 11, a configuration in which the fixing tape 70 is arranged at six positions on the peripheral portion of the battery element 20. The configuration of this type is preferable because the fixing at the four sides prevents the layer at the center of the laminate from moving by vibration or the like.

In consideration of the impregnation property of the electrolyte solution in the injection step, only a part of the fixing tapes may be fusion-bonded to the inner surface of the outer package. In this case, in order to prevent the fixing tapes which are not fusion-bonded to the film package from being detached from the battery element 20, it is preferable that the fixing tape is fusion-bonded to the battery element in advance after it is temporarily fixed with the pressure-sensitive adhesive layer 74.

Figure 12:
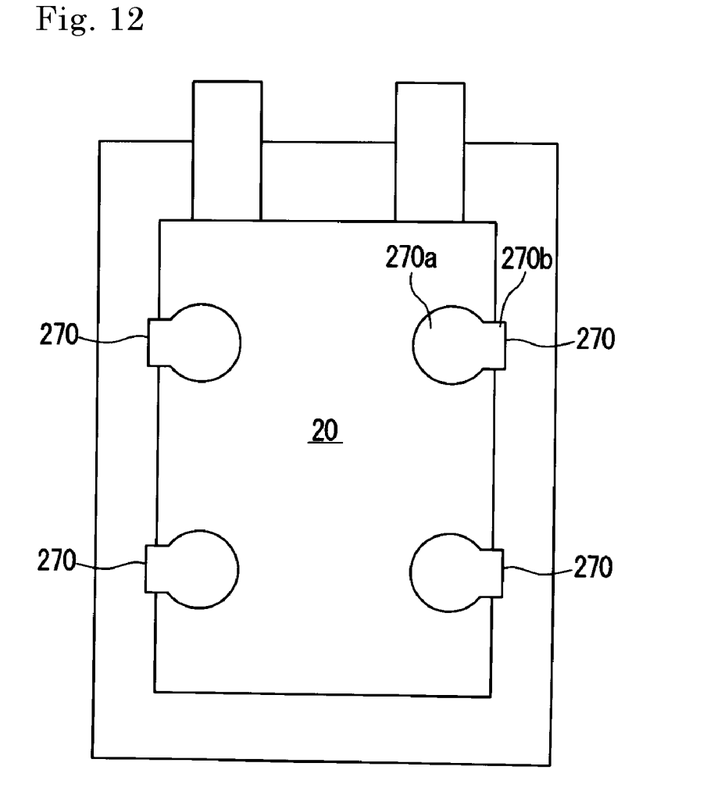
FIG. 12 is a view for explaining another example of a fixing tape.
Figure 13:
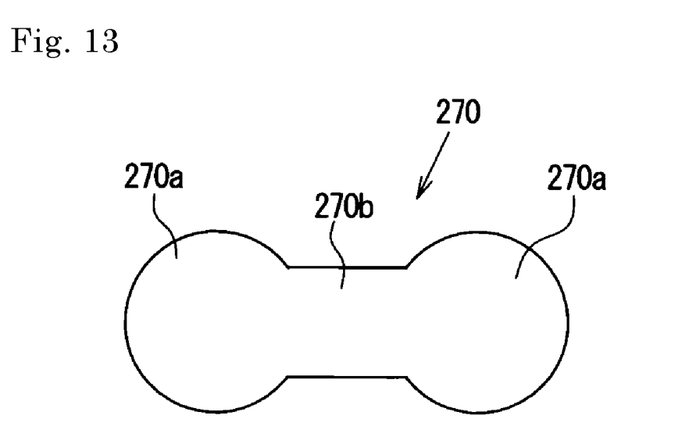
FIG. 13 is a plan view of a fixing tape before attaching.

(c) As a further alternative configuration of the fixing tape, a fixing tape 270 shaped as shown in FIGS. 12 and 13 may be used. This fixing tape 270 has two attaching portions 270a to be attached to the upper and lower surfaces of the stack and an intermediate connecting portion 270b. The attaching portion 270a may have various shapes such as, for example, a quadrangular shape, a polygonal shape, a circular shape or the like, but in this example it is circular. The width of the connecting portion 270b is formed to be narrower than the diameter of the attaching portion 270a.

According to such a fixing tape 270, as described below, it is possible to achieve compatibility between the performance at the injection of an electrolyte solution and bonding strength. That is, if the side surface portion of the stack is covered with a wide fixing tape, there is a possibility that the impregnation property into the space between the electrode layers becomes worse when injecting the electrolyte solution. On the other hand, if the tape width is made narrower in a fixing tape as shown in FIG. 4, the area of bonding the electrode and the film package becomes small, and it potentially happens that sufficient adhesive force for fixing the stack to the film package is not obtained. Therefore, it is preferable to use a tape as shown in FIGS. 12 and 13 because it is possible to achieve compatibility between the performance at the injection of an electrolyte solution and bonding strength.

(Note)

This application discloses the following invention:

1. A film package battery comprising:
   a battery element (20) having a positive electrode, a negative electrode and a separator that are stacked or wound, wherein, at least at 200° C., the separator does not melt or soften and has a heat shrinkage ratio of 3% or less;
   a film package (10) enclosing the battery element; and
   a fixing tape (70) fixed to a part of the battery element and fixed to an inner surface of the film package.

2. The film package battery as described above, wherein the fixing tape and the inner surface of the film package are fixed by fusion bonding. In other words, the fixing tape and the inner surface of the film package are in a fused state.

3. The film package battery as described above, wherein the separator is formed of at least one of a polyimide resin, a polyamide resin, and a polyphenylene sulfone resin.

4. The film package battery as described above, wherein the fixing tape has a multilayer structure comprising
   a fusion bondable layer (73), and
   a heat resistant layer (72) having a melting point higher than the melting point of the fusion bondable layer by 10° C. or more.

5. The film package battery as described above, wherein the fixing tape has a multilayer structure comprising a composite layer, and
   the composite layer (75) is obtained by impregnating a fiber with the fusion bondable layer, the fiber having a melting point higher than the melting point of the fusion bondable layer by 10° C. or more (the composite layer is in a state in which the fiber is impregnated with the fusion bondable layer).

6. The film package battery as described above, wherein the fixing tape comprises, as the fusion bondable layer,
   a first fusion bondable layer (71) fixed to an inner surface of the film package, and
   a second fusion bondable layer (73) fixed to the battery element.

7. The film package battery as described above, wherein the melting point of the fusion bondable layer is lower than a melting point of the separator.

8. The film package battery as described above, wherein the fixing tape (70) further comprises
   a pressure-sensitive adhesive layer (74) for attaching the fixing tape to the battery element before fusion bonding.

In the description of the above notes, the reference numerals in parentheses shall not be construed as limiting the present invention.

INDUSTRIAL APPLICABILITY

The film package battery according to one embodiment of the present invention can be used, for example, in any industrial field requiring a power source. For example, it can be used as power supplies for mobile equipment such as cellular phones and notebook personal computers; power supplies for electrically driven vehicles such as an electric vehicle, a hybrid vehicle, an electric motorbike, and an electric-assisted bike; power supplies for moving/transporting media such as trains, satellites and submarines; and electricity storage systems for storing electric power.

EXPLANATION OF SYMBOLS 1 film package battery
10 film package
15 fusion-bonded portion
20 battery element
25 separator
30 positive electrode
40 negative electrode
70, 70' fixing tape 71 fusion bondable layer
72 heat resistant layer
73 fusion bondable layer
74 pressure-sensitive adhesive layer
75 composite layer (fusion bondable layer impregnated within heat resistant fiber)
170, 270 fixing tape

The invention claimed is:

1. A film package battery comprising:
a battery element having a positive electrode, a negative electrode and a separator, the positive electrode, the negative electrode, and the separator being stacked or wound, wherein, at least at 200° C., the separator does not melt or soften and has a heat shrinkage ratio of 3% or less;
a film package enclosing the battery element; and
a fixing tape fixed to a part of the battery element and fixed to an inner surface of the film package, wherein the fixing tape has a multilayer structure comprising a fusion bondable layer, and a heat resistant layer having a melting point higher than a melting point of the fusion bondable layer by 10° C. or more.

2. The film package battery according to claim 1, wherein the fixing tape and the inner surface of the film package are fixed by fusion bonding.

3. The film package battery according to claim 1, wherein the separator is formed of at least one of a polyimide resin, a polyamide resin, and a polyphenylene sulfone resin.

4. The film package battery according to claim 1, wherein the fixing tape comprises, as the fusion bondable layer,
a first fusion bondable layer fixed to the inner surface of the film package, and
a second fusion bondable layer fixed to the battery element.

5. The film package battery according to claim 1, wherein the melting point of the fusion bondable layer is lower than a melting point of the separator.

6. The film package battery according to claim 1, wherein the fixing tape further comprises
a pressure-sensitive adhesive layer for attaching the fixing tape to the battery element before fusion bonding.

7. A film package battery comprising:
a battery element having a positive electrode, a negative electrode and a separator, the positive electrode, the negative electrode, and the separator being stacked or wound, wherein, at least at 200° C., the separator does not melt or soften and has a heat shrinkage ratio of 3% or less;
a film package enclosing the battery element; and
a fixing tape fixed to a part of the battery element and fixed to an inner surface of the film package, wherein the fixing tape has a multilayer structure comprising a composite layer, and the composite layer is obtained by impregnating a fiber with a fusion bondable layer, the fiber having a melting point higher than a melting point of the fusion bondable layer by 10° C. or more.

8. The film package battery according to claim 7, wherein the fixing tape and the inner surface of the film package are fixed by fusion bonding.

9. The film package battery according to claim 7, wherein the separator is formed of at least one of a polyimide resin, a polyamide resin, and a polyphenylene sulfone resin.

10. The film package battery according to claim 7, wherein the melting point of the fusion bondable layer is lower than a melting point of the separator.

11. The film package battery according to claim 7, wherein the fixing tape further comprises a pressure-sensitive adhesive layer for attaching the fixing tape to the battery element before fusion bonding.

* * * * *

UNITED STATES PATENT AND TRADEMARK OFFICE
CERTIFICATE OF CORRECTION

PATENT NO. : 10,566,660 B2
APPLICATION NO. : 15/576073
DATED : February 18, 2020
INVENTOR(S) : Kazuhiko Inoue, Makihiro Otohata and Shinya Sudo It is certified that error appears in the above-identified patent and that said Letters Patent is hereby corrected as shown below:

In the Specification

Column 6, Description of Embodiments, Lines 19-20; Delete "$Li_yNi_{(1-x)})_xO_2$" and insert --$Li_yNi_{(1-x)}M_xO_2$-- therefor Column 6, Description of Embodiments, Line 30; Delete "$0.05=\gamma\leq0.15$," and insert --$0.05\leq\gamma\leq0.15$,-- therefor In the Claims Column 15, Line 12; Claim 1, after "electrode", insert --,--

Signed and Sealed this
Fourteenth Day of July, 2020

Andrei Iancu
*Director of the United States Patent and Trademark Office*